Sept. 16, 1952  R. K. SEDGWICK  2,610,614
SERVO CONTROL FOR FLUID MOTORS
Filed July 25, 1947  3 Sheets-Sheet 2

INVENTOR.
Robert K. Sedgwick
BY
Atty

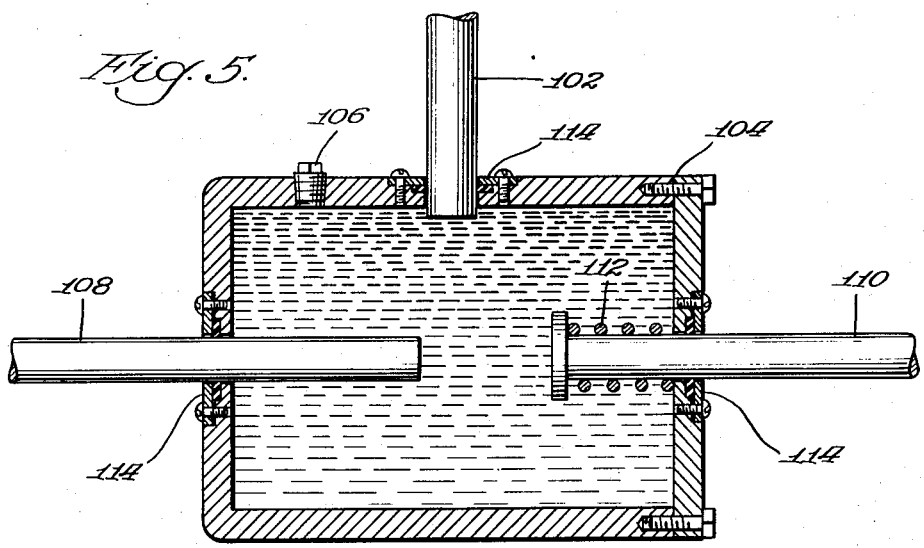
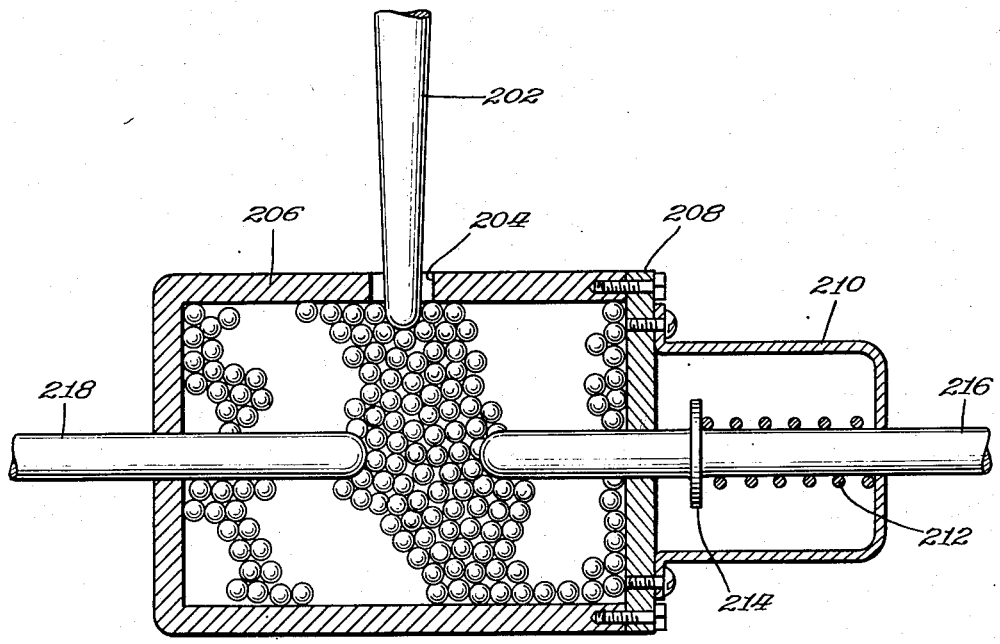

UNITED STATES PATENT OFFICE 2,610,614

SERVO CONTROL FOR FLUID MOTORS

Robert K. Sedgwick, Oak Park, Ill., assignor to American Steel Foundries, Chicago, Ill., a corporation of New Jersey Application July 25, 1947, Serial No. 763,465

4 Claims. (Cl. 121—41)

This invention relates to servo control mechanisms and more particularly to a novel wedge type servo control particularly adapted for use in an hydraulic circuit, such as is commonly associated with an hydraulic press, for actuation thereof.

In the operation of fluid powered devices, such as hydraulic presses, there is frequent need for the type of control commonly known as servo which is so arranged that the movement of the controlled element is proportional to some function of the controlling element's movement. As will be readily understood, the movement of the controlled element in a servo mechanism is proportional to the total magnitude of the movement of the controlling element, unlike a conventional valve control wherein the controlled element is actuated as long as the valve is displaced from its neutral position.

A general object of the present invention is to devise a novel and simple application of the servo principle to an hydraulic circuit, such as is commonly utilized, to actuate an hydraulic mechanism, such as a press.

Prior art controls of this type have generally involved a "floating link" with one end fulcrumed to the controlled ram, so that the operating valve is returned to its neutral position after each displacement thereof by the motion of the fulcrum. In such an arrangement, the relationship between the motion of the controlled ram and the motion of the controlling link is theoretically linear unless some complicated and expensive system of varying leverage is introduced.

Accordingly, another object of the invention is to provide servo control means of the above-described type of relatively simple construction capable of incorporating any desired tapered characteristic so as to provide varying relationship between the movement of the controlled ram and the control element.

A corollary purpose of the invention is to provide a control, such as above-described, having a characteristic of great accuracy by eliminating backlash in the mechanism.

Still another object of the invention is to devise a servo control having substantially no perceptible handle reception so that the desired delicate control may be maintained without operative fatigue.

The foregoing and other objects and advantages of the invention will become apparent from a consideration of the following specification and the accompanying drawings, wherein:

Figure 3 is a sectional view on the line 3—3 of Figure 2;

Figure 5 is a vertical sectional view of a modified form of the wedge mechanism shown in Figure 1; and Figure 6 is a vertical sectional view of another modified form of the wedge mechanism.

Figure 1:
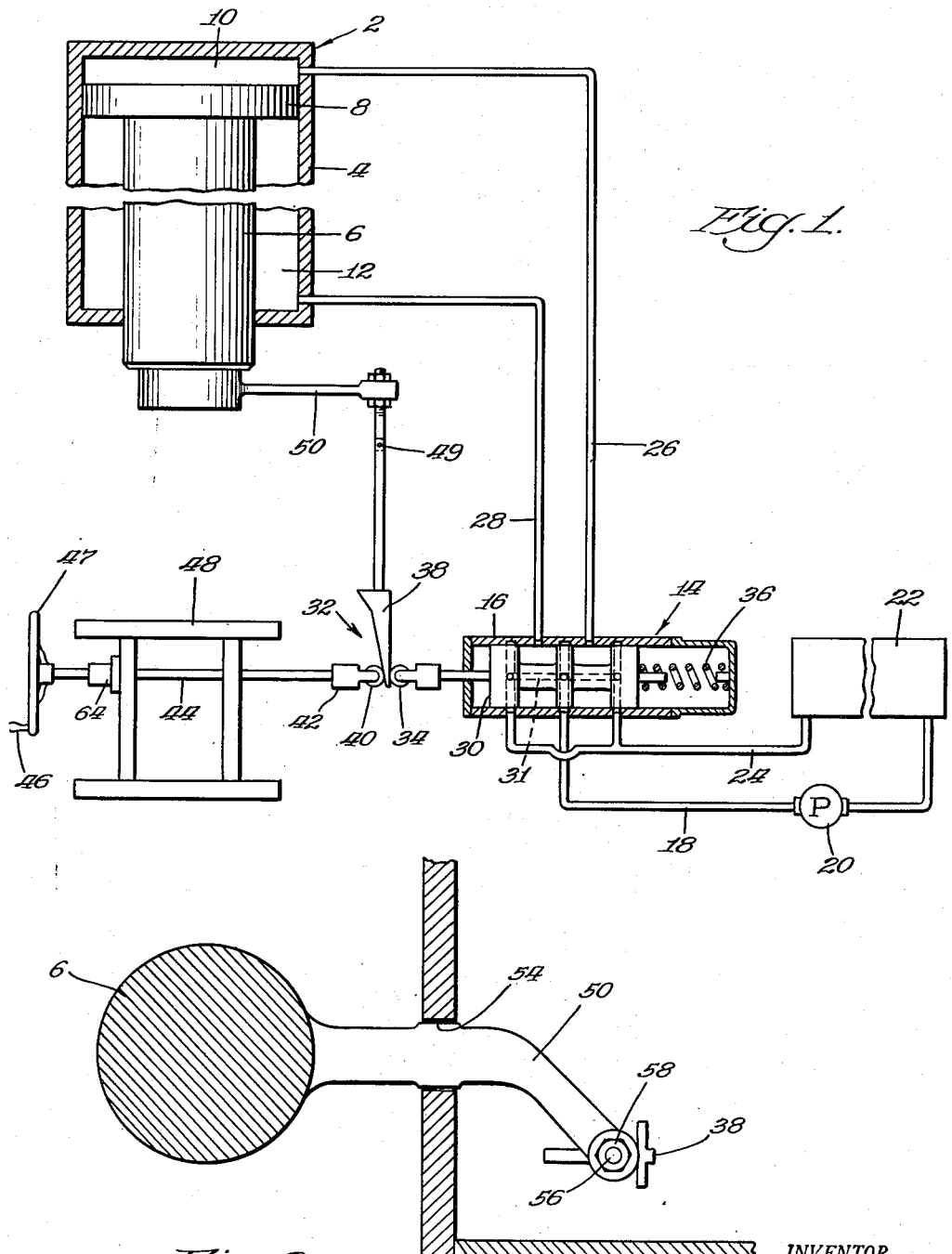
Figure 1 is a flow diagram of an hydraulic circuit embodying the invention as associated with an hydraulic press, the operating valve being greatly enlarged and being illustrated diagrammatically for the sake of clarity.

Describing the invention in detail and referring first to Figure 1, an hydraulic motor, generally designated 2, is diagrammatically shown in the form of a cylinder 4 and a ram 6 having a head 8 reciprocal within the cylinder and defining advance and return chambers 10 and 12. It will be understood that for the sake of clarity the motor 2 is only diagrammatically illustrated and may be in any conventional form with advance and return chambers in the same or separate cylinders receiving advance and return areas of the associated ram means.

The motor 2 is actuated by an hydraulic circuit including an operating valve diagrammatically illustrated at 14 and comprising a body 16 connected to a supply line 18. The line 18 is connected to the discharge side of a pump 20, the suction side of which is connected to a tank or reservoir 22 of hydraulic fluid, such as oil. The tank 22 is also connected to an exhaust or discharge line 24 which is connected to the body 16 to provide a closed circuit through the valve 14, the reservoir 22, and the pump 20 when the valve is in the neutral position shown in Figure 1.

The valve body 16 is also connected to advance and return lines 26 and 28 adapted to deliver fluid to an exhaust fluid from the respective chambers 10 and 12 during displacement of the valve stem 30 from the neutral position thereof, as hereinafter described in detail.

It may be noted that the valve stem 30 comprises an axial passage 31 adapted to connect the supply line 18 to the discharge or exhaust line 24 in the neutral position of the stem 30. In the advance position of the stem to the left of neutral, the valve 14 delivers fluid from the line 18 to the advance line 26 and exhausts fluid from the return line 28 to the discharge line 24. In the return position of the stem to the right of neutral, fluid is delivered from the supply line 18 to the return line 28 and fluid in the advance line 26 is exhausted through the discharge line 24.

It will be understood that the valve 14 is diagrammatically illustrated for the sake of clarity, and in actual practice any conventional servo valve may be utilized, preferably one which upon the slightest displacement from neutral immediately delivers fluid to one of the chambers 10 or 12 and exhausts the other.

The valve 14 is actuated by a wedge mechanism, generally designated 32, comprising a valve actuating member in the form of a roller 34 carried by the stem 30 and urged by a spring 36 into engagement with one side of a wedge 38, the opposite side of which engages an operating member in the form of a roller 40 mounted on a traveling nut 42 carried by the threaded shaft 44. The shaft 44 is rotatable by a handle 46 on a wheel 47 connected to the shaft 44. The wedge 38 is pivoted as at 49 to an arm 50 carried by the press ram 6 which is adapted to advance toward the press bed 48 during a working operation.

Clockwise rotation of the wheel 47 causes the nut 42 to travel away from the valve 14 so that the stem 30 thereof urged by the spring 36 pivots the wedge 38 and moves the stem to the left to its advance position, in which the fluid is delivered from the line 18 to the advance line 26 and is exhausted from the return line 28 whereupon the ram 6 moves on its advance stroke until the wedge 38 again actuates the valve stem 30 to its neutral position. Return movement of the ram 6 from the bed 48 is effected by counterclockwise rotation of the wheel 47 causing the traveling nut 42 to urge the wedge 38 and the stem 30 to the right of neutral thereby actuating the stem 30 to its return position whereat fluid is delivered from the supply line 18 to the return line 28 and is exhausted from the advance line 26, whereupon the ram 6 moves on its return stroke until the wedge 38 has released the stem 30 accommodating movement thereof to its neutral position by the spring 36.

Figure 2:
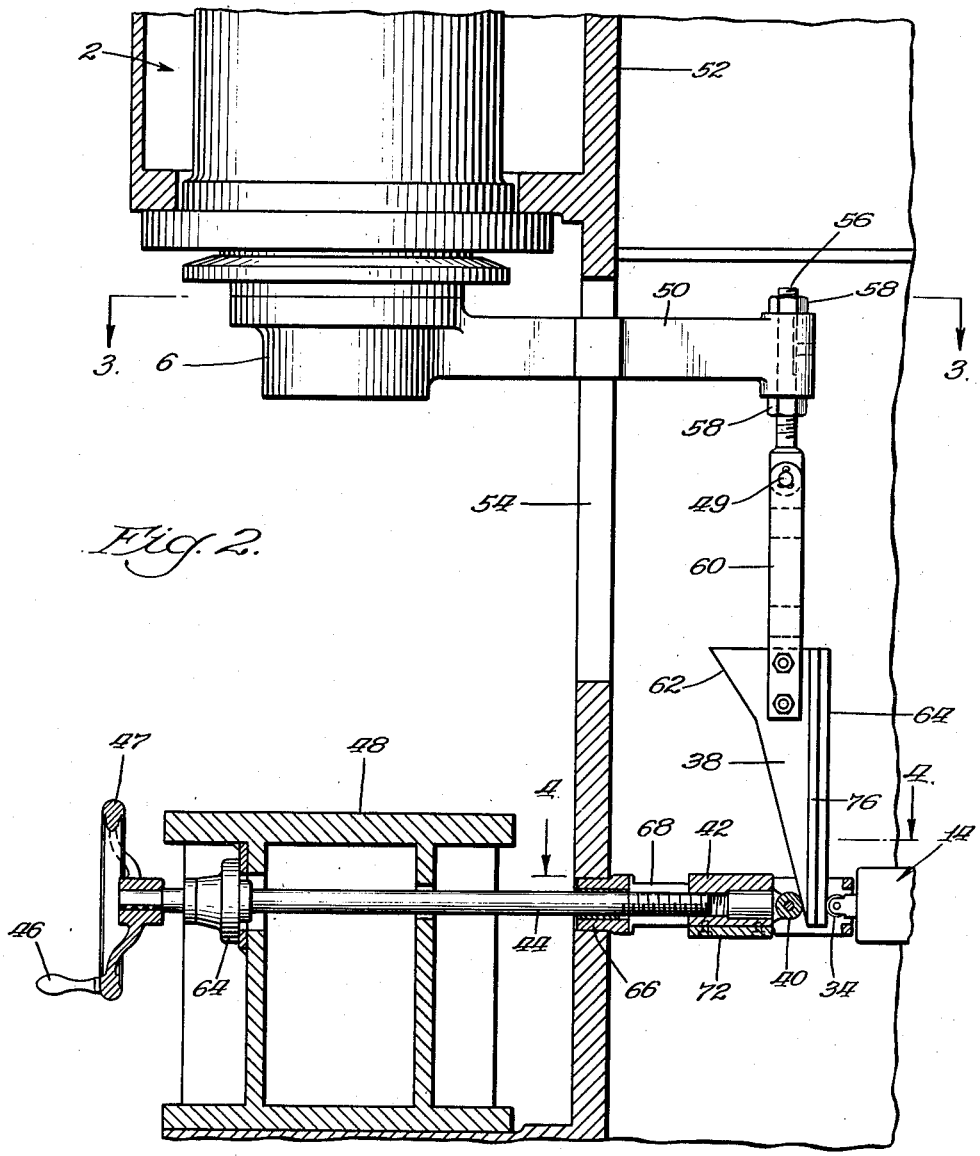
Figure 2 is an enlarged side elevation partly in vertical section of an hydraulic press incorporating the servo control shown in Figure 1.
Figure 4:
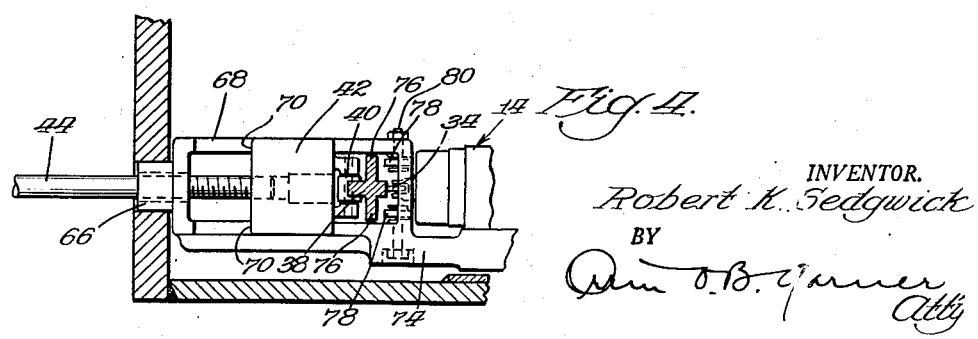
Figure 4 is a sectional view on the line 4—4 of Figure 2.

Referring now to Figures 2 to 4, it will be seen that the hydraulic motor 2 is supported by a press frame 52 which also supports the bed 48, said frame being slotted as at 54 for guidable reception of the arm 50. The arm 50 is provided with a threaded bolt 56 adjustably mounted on the arm by a pair of nuts 58, and the bolt is afforded the before-mentioned pivotal connection at 49 to a shank or stem 60 connected to the wedge 38. By means of the bolt 56, the vertical position of the wedge 38 relative to the ram 6 may be adjusted.

In this connection, it may be noted that the wedge may be provided at its upper end with a surface 62 having relatively great angularity with respect to the vertical surface 64 thereof which engages the valve actuating roller 34. Thus as the ram 6 reaches the end of its advance stroke, a relatively large motion of the hand wheel 47 is required to effect a small movement of the ram. Such an arrangement enables the operator to move the ram in small increments at the end of the advance stroke where delicate adjustment is frequently desirable to move the ram against the work on the working stroke of the device. It will be understood that the surfaces of the wedge 38 which engage the rollers may be of any desired configuration for the purpose of varying the rate at which the valve 14 is moved to neutral at different points in the strokes of the ram.

It may be noted, as best seen in Figure 2, that the shaft 44 is provided adjacent one end thereof with a bearing 64 and a journal adjacent its opposite end within a cylindrical lug 66 integrally formed with a frame 68 adapted to guide the traveling nut 42 and the wedge 38, as best seen in Figure 4. The nut 42 is provided with flanges 70 at opposite sides thereof overlying the frame 68, and, as best seen in Figure 2, the nut is provided on the lower surface thereof with a guide plate 72 removably secured thereto in any convenient manner and underlying the frame 68. Thus the nut 42 is restrained against rotation and is guided in its movement toward and away from the valve 14 during actuation of the shaft 44. The valve 14, as best seen in Figure 4, is preferably mounted on an arm 74 of the frame 68.

The wedge 38 is provided with spaced flanges 76 at opposite sides thereof engageable with the sides of the frame 68 which thus serves as a guide for the wedge. The end of the frame 68 adjacent the valve 14 is provided with spaced rollers 78 mounted on a bolt and nut assembly 80 and engageable with the flanges 76 of the wedge when the latter is urged to the right by the roller 40 to actuate the roller 34 and the valve stem 30 to their reverse position.

Referring now to Figure 5, a modification of the wedge mechanism is illustrated therein and comprises a wedge member 102 in the form of a piston reciprocal within a complementary opening in a casing or body 104 containing hydraulic fluid admitted to the casing by a removable filler plug 106. In this modification of the wedge mechanism, the operating member 108 is in the form of a piston reciprocal within the casing 104 through a complementary opening therein and adapted for convenient actuation as by means of the traveling nut 42, described in the previous embodiment. The valve actuating member 110 which is adapted for connection to the stem 30 of the operating valve 14 is in the form of a piston member reciprocal within the casing 104 and is actuated to advance position by a spring 112 upon retraction of the operating piston 108, whereupon the wedge piston 102 which is adapted for connection to the arm 50 of the ram is moved downwardly into the casing 104 to return the valve actuating piston 110 to neutral position against the resistance of the spring 112. The ram is actuated on its return stroke by urging the operating member 108 into the casing to move the valve actuating member 110 to return position against the resistance of the spring 112 whereupon withdrawal of the wedge piston 102 is operable to accommodate return of the valve actuating member 110 to its neutral position by the spring 112. Each of the pistons 102, 108, and 110 is provided with a convenient packing gland 114 to afford a fluid-tight seal therearound.

It will be understood that the modification of Figure 5 is an arrangement wherein the relationship between the movement of the operating member 108 and the valve actuating piston 110 is substantially linear. In other words, throughout the stroke of the ram a given displacement of the operating member 108 in either direction produces the same increment of ram travel, inasmuch as the wedge piston 102 is effective throughout the stroke of the ram to displace the same amount of fluid within the casing 104 for each equal increment of ram travel.

Referring now to Figure 6, another modification of the wedge mechanism is shown somewhat similar to that illustrated in Figure 5 but accommodating delicate adjustment of the ram at the end of the advance stroke thereof by providing a tapered wedge piston 202 adapted for connection to the arm 50 of the ram. In the modification of Figure 6, the wedge piston 202 is reciprocal within an opening 204 in a casing 206 filled with lubricated steel balls, the diameters of which are greater than the clearance between the piston 202 and the margins of the opening 204. One end of the casing 206 is closed by a cover plate 208 to which is secured a spring bonnet 210 containing a spring 212 compressible between the bonnet and an annular flange 214 on a valve actuating piston 216 adapted for connection to the stem 30 of the operating valve 14. The piston 216 extends through a complementary opening on the cover plate 208 in the casing 206 in opposition to the operating piston 218 adapted for actuation as by the traveling nut 42, described in the embodiment of Figures 1 to 4. In operation of the modification of Figure 6, the advance stroke of the ram is effected by withdrawal of the piston 218 from the casing 206 whereupon the spring 212 urges the valve actuating piston 216 to the advance position thereof until the wedge piston 202 moving downwardly with the ram restores the valve actuating piston 216 to neutral position. As above noted, the tapered construction of the wedge piston 202 accommodates a more rapid restoration of the valve actuating piston 216 to its neutral position toward the end of the advance stroke of the ram. The ram is actuated on its return stroke by actuation of the operating piston 218 inwardly with respect to the casing 206 thereby urging the valve actuating piston 216 to its reverse position against the resistance of the spring 212 until withdrawal of the wedge piston 202 accommodates restoration of the piston 216 to its neutral position by the spring 212. In the modification of Figure 6, packing glands may be eliminated inasmuch as the steel balls within the casing 206 are unable to escape therefrom.

It is to be understood that I do not wish to be limited by the exact embodiments of the device which are merely by way of illustration and not limitation as various and other forms of the device will, of course, be apparent to those skilled in the art without departing from the spirit of the invention or the scope of the claims.

I claim:

1. In an operating circuit for an hydraulic motor having cylinder means including advance and return chambers, and having ram means presenting advance and return pressure areas in respective chambers to be acted on by pressure fluid therein; the combination of a source of hydraulic pressure fluid, valve means connected to said source and to said cylinder means, said valve means being adapted in one operating position thereof to deliver fluid from said source to said advance chamber and to exhaust fluid from said return chamber, and said valve means being adapted in another position thereof to deliver fluid from said source to said return chamber and to exhaust fluid from said advance chamber, spring means operatively connected to said valve means for yieldingly urging the same to one of said positions thereof, an actuating member connected to said valve means for actuation thereof against the resistance of said spring means, an operating member spaced from said actuating member, a control member movable with said ram means and having an operative connection with said actuating and operating members, said connection comprising a casing and a flowable, substantially noncompressible medium confined by the casing and contacting said members, said flowable medium being characterized by ball-like elements of greater size than the maximum clearance between the control member and an opening in the casing receiving said control member, said control member being movable into the casing as said ram moves on advance stroke thereof, and means for moving said operating member toward and away from the actuating member, whereby the valve means is actuated to one of said positions thereof in response to movement of said operating member.

2. A circuit, according to claim 1, wherein the control member is of non-uniform cross section.

3. A circuit, according to claim 2, wherein the control member tapers into the casing.

4. In an hydraulic circuit for an hydraulic motor comprising cylinder means including advance and return chambers, and ram means reciprocal within said cylinder means presenting advance and return areas within respective chambers; the combination of operating valve means associated with said cylinder means to alternately deliver pressure fluid to and exhaust pressure fluid from respective chambers, an actuating member connected to said valve means, an operating member, a wedge member of varying cross-sectional area movable with said ram means, a casing filled with substantially rigid ball-like members constituting a substantially non-compressible flowable medium and having openings receiving all of said members in spaced relationship to each other, and means externally of said casing for moving said operating member into and out of the same.

ROBERT K. SEDGWICK.

REFERENCES CITED

The following references are of record in the file of this patent:

UNITED STATES PATENTS

| Number | Name | Date |
|---|---|---|
| 689,186 | Heisler | Dec. 17, 1901 |
| 752,491 | Warren | Feb. 16, 1904 |
| 897,907 | Lang | Sept. 8, 1908 |
| 1,106,434 | Woodward | Aug. 11, 1914 |
| 1,564,683 | Kimball | Dec. 8, 1925 |
| 1,692,771 | Ferris | Nov. 20, 1928 |
| 2,104,122 | Goates | Jan. 4, 1938 |
| 2,109,162 | Boehle | Feb. 22, 1938 |
| 2,129,613 | Wunsch | Sept. 6, 1938 |

FOREIGN PATENTS

| Number | Country | Date |
|---|---|---|
| 307,817 | Great Britain | Mar. 14, 1929 |